(12) United States Patent
Chen et al.

(10) Patent No.: US 8,873,417 B2
(45) Date of Patent: *Oct. 28, 2014

(54) TECHNIQUES USING DIFFERENTIAL PRECODING FOR HIGHLY CORRELATED CHANNELS IN WIRELESS NETWORKS

(75) Inventors: Xiaogang Chen, Beijing (CN); Yuan Zhu, Beijing (CN); Qinghua Li, San Ramon, CA (US); Xintian E. Lin, Palo Alto, CA (US); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,613

(22) Filed: Aug. 22, 2012

(65) Prior Publication Data

US 2013/0223495 A1 Aug. 29, 2013

Related U.S. Application Data

(63) Continuation of application No. 12/757,109, filed on Apr. 9, 2010, now Pat. No. 8,737,199.

(51) Int. Cl.
*G01R 31/08* (2006.01)
*H04B 7/04* (2006.01)
*H04B 7/06* (2006.01)

(52) U.S. Cl.
CPC ............ *H04B 7/0478* (2013.01); *H04B 7/0465* (2013.01); *H04B 7/0641* (2013.01); *H04B 7/0639* (2013.01); *H04B 7/0617* (2013.01)
USPC ............................................ 370/252; 375/267

(58) Field of Classification Search
USPC ......... 370/332–338, 252–253, 310, 349–350, 370/342; 375/267, 308, 295
See application file for complete search history.

(56) References Cited

U.S. PATENT DOCUMENTS 7,839,945 B2   11/2010  Khojastepou et al.
8,149,791 B2*   4/2012  Li et al. ..................... 370/334
(Continued)

FOREIGN PATENT DOCUMENTS

CN   101635612 A   1/2010
WO   2008/030035 A2  3/2008

OTHER PUBLICATIONS

Office Action received for Chinese Patent Application No. 201110093190.2, mailed on May 21, 2013, 21 pages of Office action including 11 pages of English translation.

(Continued)

*Primary Examiner* — Ricky Ngo
*Assistant Examiner* — Iqbal Zaidi
(74) *Attorney, Agent, or Firm* — Thorpe, North & Western, LLP

(57) ABSTRACT

An embodiment of the present invention provides a method of using differential precoding feedback for correlated channels, comprising, transmitting by a mobile station (MS) as feedback an index angle for a differential discrete Fourier transform (DFT) codeword corresponding to a shift of a dominant beam represented by a base codeword, where the feedback corresponds to a precoding vector $V(t)=Q(\hat{\theta})$ for index angle $\hat{\theta}$, where $$Q(\hat{\theta}) = \begin{bmatrix} 1 \\ e^{j2\pi m/32} \\ e^{j4\pi m/32} \\ e^{j6\pi m/32} \end{bmatrix}$$

and $m=-16\cos(\hat{\theta})$.

27 Claims, 2 Drawing Sheets

(56) References Cited

U.S. PATENT DOCUMENTS

| | | | |
|---|---|---|---|
| 2007/0160011 A1 | 7/2007 | Kim et al. | |
| 2008/0232501 A1* | 9/2008 | Khojastepour et al. | 375/267 |
| 2008/0273624 A1 | 11/2008 | Kent et al. | |
| 2010/0054114 A1 | 3/2010 | Li et al. | |
| 2011/0064156 A1* | 3/2011 | Kim et al. | 375/267 |
| 2011/0249655 A1 | 10/2011 | Chen et al. | |

OTHER PUBLICATIONS

Ding et al, "Research on Modulation Diversity of Bit-Interleaved Space-Time Coded Modulation" Wanfang Science Periodical Database, Issue 3, vol. 31, Mar. 2008. Abstract only.

Luo et al.,"Space-Time-Frequency Block Coding for OFDM" Wanfang Science Periodical Database, Issue 3, vol. 27, 2005.

Office Action Received for U.S. Appl. No. 12/757,109, mailed on May 3, 2013, 15 pages.

Office Action Received for the Korean Patent Application No. 2011-0032926, mailed on Jul. 26, 2012, 3 pages of English Translation only.

Non Final Office Action Received for the U.S. Appl. No. 12/757,109, mailed on Jun. 8, 2012, 16 pages.

Non Final Office Action received for U.S. Appl. No. 12/757,109, mailed on Jan. 3, 2013, 14 pages.

Notice of Allowance received for Korean Patent Application 10-2011-0032926, mailed on Dec. 26, 2012, 3 Pages of Office Action including 1 pages of English Translation.

Notice of Allowance received for U.S. Appl. No. 12/757,109, mailed on Dec. 27, 2013, 9 Pages.

Office Action received for Chinese Patent Application No. 201110093190.2, mailed on Feb. 8, 2014, 5 pages of English Translation and 9 pages of Chinese Office Action.

Office Action received for the Chinese Patent Application No. 201110093190.2, mailed on Jul. 2, 2014, 5 pages of English Translation and 3 pages of Office Action.

* cited by examiner

TECHNIQUES USING DIFFERENTIAL PRECODING FOR HIGHLY CORRELATED CHANNELS IN WIRELESS NETWORKS

CROSS REFERENCE TO RELATED APPLICATIONS

This application is a Continuation of U.S. patent application Ser. No. 12/757,109, filed Apr. 9, 2010, entitled "TECHNIQUES USING DIFFERENTIAL PRECODING FOR HIGHLY CORRELATED CHANNELS IN WIRELESS NETWORKS," which is herein incorporated by reference in its entirety.

BACKGROUND

In orthogonal frequency multiple access—multiple input multiple output (OFDMA-MIMO) based broadband radio systems such as, but not limited to, those that conform to the institute for electronic and electrical engineers (IEEE) 802.16m or LTE (Long Term Evolution—3GPP 4G technology) systems, beamforming is an effective method to improve the receiving signal to noise ratio (SNR). When the base station's (BS's) transmit antennas are closely mounted, the antenna beam pattern usually has low spatial selectivity, and thus the principle Eigen mode dominates the capacity. In addition, the elements of the ideal precoding vectors are usually constant modulus for highly correlated antennas.

Thus, a strong need exists for techniques using differential precoding for highly correlated channels in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
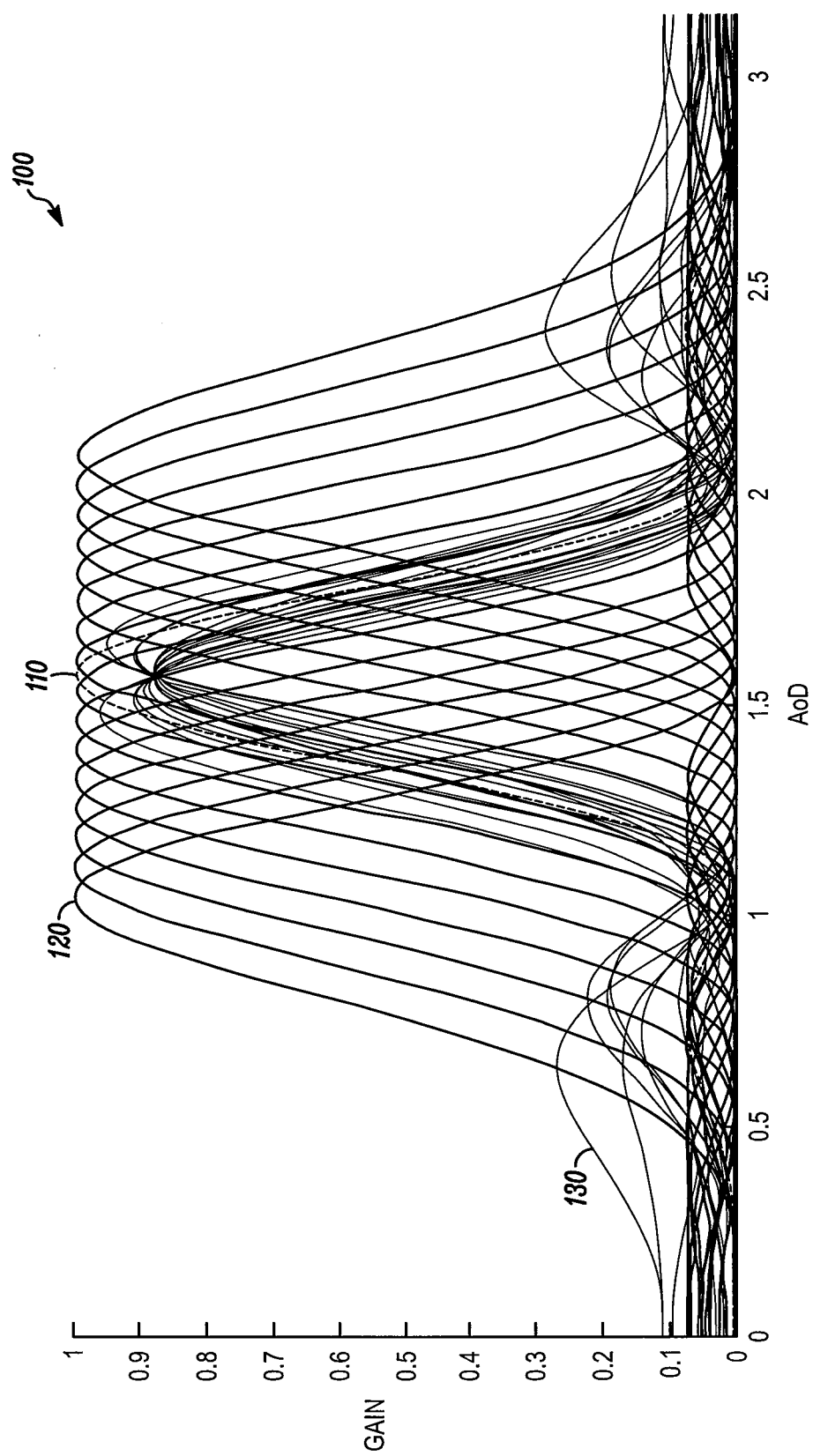
FIG. 1 provides an antenna array response of base codeword and the differential codewords according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide a differential codebook optimized for highly correlated antennas and may be adapted to the "downloadable" codebook in LTE. Compared with existing differential precoding schemes, the proposed codebook of the present invention has better performance, especially for a high speed environment and lower complexity at a mobile station (MS).

Assuming there are $N_t$ transmit antenna, $V(t-1)$ is the precoding vector used at the last frame and $V(0)$ is the base codeword selected at the first frame of a differential period (e.g. 4 frames). Firstly, an MS needs to measure the short term channel covariance matrix $$R = H^H H. \quad (1)$$

Secondly, the MS needs to determine the feedback with the following criteria:

$$\hat{\theta} = \underset{\hat{\theta} \in \theta_s}{\operatorname{argmax}} \det\left(I + \frac{\gamma}{N_s} Q(\theta)^H R Q(\theta)\right). \quad (2)$$

where:

$$\theta_s \in \left[\theta_b - \alpha : \frac{2\alpha}{15} : \theta_b + \alpha\right] \quad (3)$$

$$Q(\hat{\theta}) = \begin{bmatrix} 1 \\ \exp(-j\pi\cos(\hat{\theta})) \\ \exp(-j2\pi\cos(\hat{\theta})) \\ \exp(-j3\pi\cos(\hat{\theta})) \end{bmatrix} \quad (4)$$

$$\theta_b = \underset{\theta \in [0,\pi)}{\operatorname{argmax}} |a(\theta)^H V(0)|^2, \quad (5)$$

$$a(\theta) = \left[\begin{array}{cccc} 1 & e^{-j2\pi\frac{d}{\lambda}\cos(\theta)} & e^{-j2\pi\frac{2d}{\lambda}\cos(\theta)} & \cdots & e^{-j2\pi\frac{(N_t-1)d}{\lambda}\cos(\theta)} \end{array}\right],$$

which is the angle corresponding to the maximum of antenna array responds; $\theta_s$ is a set of predefined angles in a range of $[-\alpha, \alpha]$ degree ($\alpha=15$ is recommended). Then the index of $\hat{\theta}$ is feedback to a base station (BS).

Based on the $\hat{\theta}$ that is feedback from the MS, the BS reconstruct precoding vector as following:

$$V(t) = Q(\hat{\theta}) \quad (6)$$

Table I below compares the performance of the existing differential precoding scheme and the differential precoding scheme according to embodiments of the present invention. The performance when only a base codebook is used is also listed for comparison. For a base codebook only scheme, 6 bits is fed back every frame by MS; for the two differential schemes, 4 bits is feedback from MS at the first frame in each reset period (4 frames) to select the 16 DFT codeword in base codebook, and 4 bits is feedback for differential codebook selection in the succeed frames. It can be seen that embodiments of the present invention outperforms a 16 m differential scheme except when the 5 degree 16 m differential codebook is used and MS speed is low. Moreover, the 20 degree 16 m differential codebook cannot track the changes of a channel when an MS moves with a high speed.

TABLE I

Performance comparisons of differential precoding schemes

| | 3 km/h 20 degree | | | | 30 km/h 20 degree | | | | 120 km/h 20 degree | | | |
|---|---|---|---|---|---|---|---|---|---|---|---|---|
| SNR(dB) | 0 | 4 | 8 | 12 | 0 | 4 | 8 | 12 | 0 | 4 | 8 | 12 |
| Base_only | 2.8553 | 4.0224 | 5.2765 | 6.5729 | 2.8099 | 3.971 | 5.2217 | 6.5165 | 2.807 | 3.9688 | 5.22 | 6.5151 |
| Diff_16 m | 2.8556 | 4.0227 | 5.2768 | 6.5732 | 2.8042 | 3.9646 | 5.2149 | 6.5094 | 2.8003 | 3.9613 | 5.2121 | 6.507 |
| Diff_new | 2.8657 | 4.0341 | 5.2888 | 6.5855 | 2.8182 | 3.9803 | 5.2316 | 6.5265 | 2.8173 | 3.9802 | 5.232 | 6.5274 |

| | 3 km/h 5 degree | | | | 30 km/h 5 degree | | | | 120 km/h 5 degree | | | |
|---|---|---|---|---|---|---|---|---|---|---|---|---|
| SNR(dB) | 0 | 4 | 8 | 12 | 0 | 4 | 8 | 12 | 0 | 4 | 8 | 12 |
| Base_only | 2.8553 | 4.0224 | 5.2765 | 6.5729 | 2.8099 | 3.971 | 5.2217 | 6.5165 | 2.807 | 3.9688 | 5.22 | 6.5151 |
| Diff_16 m | 2.8665 | 4.0349 | 5.2898 | 6.5865 | 2.8137 | 3.9753 | 5.2263 | 6.5211 | 2.8112 | 3.9734 | 5.2249 | 6.5201 |
| Diff_new | 2.8657 | 4.0341 | 5.2888 | 6.5855 | 2.8182 | 3.9803 | 5.2316 | 6.5265 | 2.8173 | 3.9802 | 5.232 | 6.5274 |

The principle of the present invention may be similar to the existing 802.16m precoding scheme. However, embodiments of the present invention provide a difference in equation (2) set forth above, where in the existing 16 m scheme $U=[V(t-1) V(t-1)^{-1}]^H$, and Q is the predefined differential codebook where the differential codeword around the center codeword with a fixed degree, e.g. 20 degree.

For highly correlated antennas, the elements of precoding codeword are constant modulus in most case. The proposed differential codebook realizes this property by rotating the elements of the DFT codeword in a base codebook with some corresponding angles. This will keep the constant modulus property of DFT codeword after differential operation. This is preferred for power amplifier at the radio chains.

With a properly designed differential codebook, the dominate beam of an antenna array response of differential codeword may shift within a predefined angle compared with the beam of the corresponding base codeword. This property will guarantee a maximum gain in the principle Eigen mode of the channel in the viewpoint of an antenna array response.

Looking now at FIG. 1, shown generally as 100, shows this property clearly as Gain vs. AoD. Line 110 shows the antenna array response of a base codeword and lines 120 are the antenna array response after the proposed differential scheme. Lines 130 are the antenna array response after the 16 m differential scheme.

In addition, the Q operation is only needed to be performed one time in a reset period at the MS instead of being calculated every frame if the shifting angle range is designed properly (for example, but not limited to [−20 20] degrees may be recommended). Thus the complexity is reduced at MS.

Figure 2:
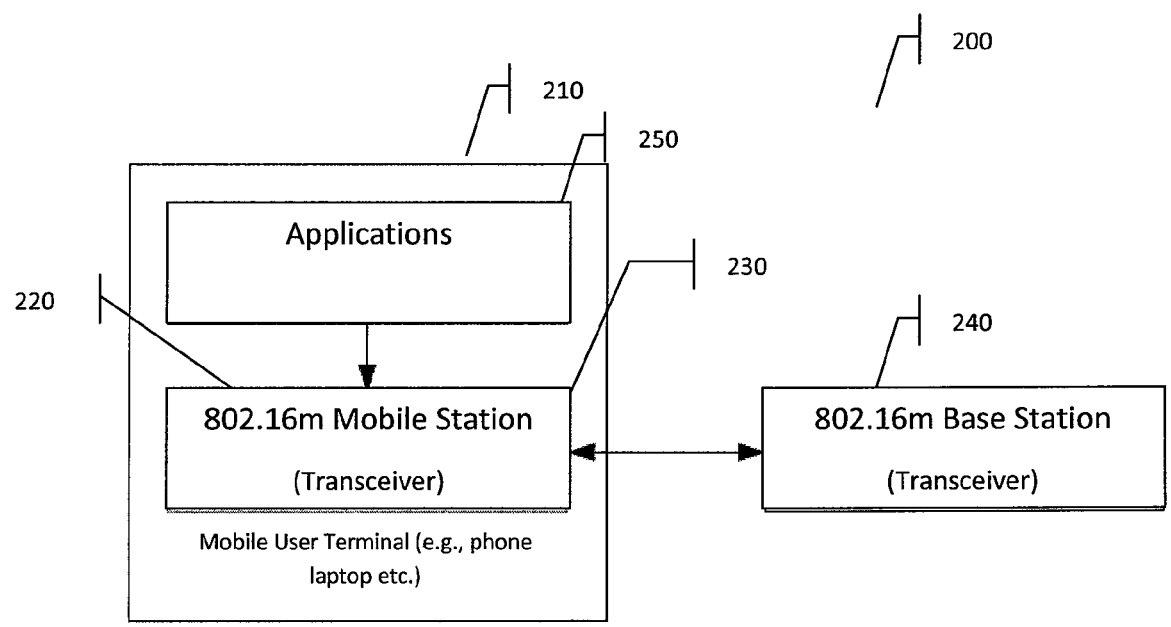
FIG. 2 illustrates a system according to embodiments of the present invention.

Turning to FIG. 2 at 200 provides a system diagram according to embodiments of the present invention, in which an 802.16 MS 220 and applications 230 are collocated in a mobile user terminal 210, such as, but not limited to mobile phone, laptop, PDA etc. MS and a base station (BS) 240 may communicate wirelessly. Both MS and BS may utilize transceivers that operate according to the embodiments set forth herein.

A further embodiment of the present invention may provide a computer readable medium encoded with computer executable instructions, which when accessed, cause a machine to perform operations comprising using differential precoding for highly correlated channels in a wireless network, comprising by using a differential codebook optimized for highly correlated antennas.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A non-transitory computer readable medium with computer executable instructions stored thereon, which when accessed, cause a machine to perform operations for a method of using differential precoding feedback for correlated channels, comprising:

transmitting by a mobile station (MS) as feedback an index angle for a differential discrete Fourier transform (DFT) codeword corresponding to a shift of a dominant beam represented by a base codeword, wherein the feedback corresponds to a precoding vector $V(t)=Q(\hat{\theta})$ for index angle $\hat{\theta}$, where $$Q(\hat{\theta}) = \begin{bmatrix} 1 \\ e^{j2\pi m/32} \\ e^{j4\pi m/32} \\ e^{j6\pi m/32} \end{bmatrix}$$

and $m=-16\cos(\hat{\theta})$.

2. The computer readable medium of claim 1, wherein the feedback uses 4 bits for a differential codebook selection in a subsequent frame after a base DFT codeword in a base codebook is selected for a first frame.

3. The computer readable medium of claim 1, further comprising:

measuring by a short term channel covariance matrix $R=H^H H$ by the MS; and determining index angle $$\hat{\hat{\theta}} = \underset{\hat{\theta} \in \theta_s}{\text{argmaxdet}}\left(I + \frac{\gamma}{N_s}Q(\theta)^H R Q(\theta)\right)$$

at the MS, where $$\theta_s \in \left[\theta_b - \alpha : \frac{2\alpha}{15} : \theta_b + \alpha\right],$$

$$\theta_b = \underset{\theta \in [0,\pi)}{\text{argmax}}|a(\theta)^H V(0)|^2,$$

and $$a(\theta) = \begin{bmatrix} 1 & e^{-j2\pi\frac{d}{\lambda}\cos(\theta)} & e^{-j2\pi\frac{2d}{\lambda}\cos(\theta)} & \dots & e^{-j2\pi\frac{(N_t-1)d}{\lambda}\cos(\theta)} \end{bmatrix},$$

$\theta_s$ is a set of predefined angles in a range of $[-\alpha, \alpha]$ degrees, $\theta_b$, is a base angle for the base codeword, and V(0) is the base codeword selected at a first frame of a differential period.

4. The computer readable medium of claim 1, wherein Q is a predefined differential codebook where the differential DFT codeword is shifted from a center codeword by a fixed angle.

5. The computer readable medium of claim 1, further comprising prior to transmitting the differential DFT codeword:
   feeding back by the MS a base DFT codeword in a base codebook using 4 bits, wherein the base DFT codeword is selected from sixteen predefined codewords.

6. The computer readable medium of claim 1, wherein the differential DFT codeword is included in a differential codebook that rotates angles of DFT codewords in a base codebook corresponding to the index angle to maintain a constant modulus of the differential DFT codewords.

7. The computer readable medium of claim 1, wherein the differential DFT codeword is included in a differential codebook optimized for correlated antennas and is adaptable to a downloadable codebook used in a wireless network that conforms to an Institute for Electronic and Electrical Engineering (IEEE) 802.16m or a third generation partnership project (3GPP) long term evolution (LTE) standard.

8. A computing device including circuitry to perform operations for a method of using differential precoding feedback for correlated channels, comprising:
   receiving feedback from a wireless device at base station (BS) an index angle for a differential discrete Fourier transform (DFT) codeword corresponding to a shift of a dominate beam represented by a base codeword,
   wherein the feedback corresponds to a precodinq vector V(t)=Q($\hat{\theta}$) for index angle $\hat{\theta}$, where $$Q(\hat{\theta}) = \begin{bmatrix} 1 \\ e^{j2\pi m/32} \\ e^{j4\pi m/32} \\ e^{j6\pi m/32} \end{bmatrix}$$

and m=−16 cos($\hat{\theta}$).

9. The computing device of claim 8, wherein the feedback uses 4 bits for a differential codebook selection in a subsequent frame after a base DFT codeword in a base codebook is selected for a first frame.

10. The computing device of claim 8, further comprising:
    reconstructing the precoding vector V(t) using the index angle in a predefined differential codebook based on a last precoding vector of a last frame and a base code word for a first frame.

11. The computing device of claim 8, further comprising:
    reconstructing the precoding vector V(t) using the index angle $\hat{\theta}$ in a predefined differential codebook Q, a base code word V(0), wherein the index angle $$\hat{\theta} = \underset{\hat{\theta} \in \theta_s}{\text{argmaxdet}}\left(I + \frac{\gamma}{N_s}Q(\hat{\theta})^H R Q(\hat{\theta})\right),$$

where a short term channel covariance matrix $R=H^H H$ is measured by the wireless device, $$\theta_s \in \left[\theta_b - \alpha : \frac{2\alpha}{15} : \theta_b + \alpha\right],$$

$$\theta_b = \underset{\theta \in [0,\pi)}{\text{argmax}}|a(\theta)^H V(0)|^2,$$

and $$a(\theta) = \begin{bmatrix} 1 & e^{-j2\pi\frac{d}{\lambda}\cos(\theta)} & e^{-j2\pi\frac{2d}{\lambda}\cos(\theta)} & \dots & e^{-j2\pi\frac{(N_t-1)d}{\lambda}\cos(\theta)} \end{bmatrix},$$

$\theta_s$ is a set of predefined angles in a range of $[-\alpha, \alpha]$ degrees, $\theta_b$, is a base angle for the base codeword, and V(0) is the base codeword selected at a first frame of a differential period.

12. The computing device of claim 8, wherein Q is a predefined differential codebook where the differential DFT codeword is shifted from a center codeword by a fixed angle.

13. The computing device of claim 8, further comprising prior to receiving the differential DFT codeword:
    receiving feedback from the wireless device at the BS a base DFT codeword in a base codebook using 4 bits, wherein the base DFT codeword is selected from sixteen predefined codewords.

14. The computing device of claim 8, wherein the differential DFT codeword is included in a differential codebook that rotates elements of a DFT codeword in a base codebook with angles corresponding to the index angle to keep a constant modulus property of the differential DFT codewords after a transmission using a precoding vector in a differential operation.

15. The computing device of claim 8, wherein the differential DFT codeword is included in a differential codebook optimized for correlated antennas and is adaptable to a downloadable codebook used in a wireless network that conforms to an Institute for Electronic and Electrical Engineering (IEEE) 802.16m or a third generation partnership project (3GPP) long term evolution (LTE) standard.

16. A wireless device to use differential precoding for correlated antennas in a wireless network, the wireless device, comprising:
    a transceiver adapted for communication with a base station (BS) in a wireless network, wherein the transceiver is further configured to transmit as feedback to the BS an index angle for a differential discrete Fourier transform (DFT) codeword corresponding to a shift of a dominate beam represented by a base codeword,
    wherein the feedback corresponds to a precodinq vector V(t)=Q ($\hat{\theta}$) for index angle $\hat{\theta}$, where $$Q(\hat{\theta}) = \begin{bmatrix} 1 \\ e^{j2\pi m/32} \\ e^{j4\pi m/32} \\ e^{j6\pi m/32} \end{bmatrix}$$

and $m=-16\cos(\hat{\theta})$.

17. The wireless device of claim 16, wherein the feedback uses 4 bits for a differential codebook selection in a subsequent frame after a base DFT codeword in a base codebook is selected for a first frame.

18. The wireless device of claim 16, wherein the transceiver is further configured to:
measure by a short term channel covariance matrix $R=H^H H$; and determine index angle $$\hat{\theta} = \underset{\hat{\theta} \in \theta_s}{\mathrm{argmaxdet}} \left( I + \frac{\gamma}{N_s} Q(\hat{\theta})^H R Q(\hat{\theta}) \right),$$

where $$\theta_s \in \left[ \theta_b - \alpha : \frac{2\alpha}{15} : \theta_b + \alpha \right],$$

$$\theta_b = \underset{\theta \in [0,\pi)}{\mathrm{argmax}} |a(\theta)^H V(0)|^2,$$

and $$a(\theta) = \begin{bmatrix} 1 & e^{-j2\pi \frac{d}{\lambda}\cos(\theta)} & e^{-j2\pi \frac{2d}{\lambda}\cos(\theta)} & \ldots & e^{-j2\pi \frac{(N_t-1)d}{\lambda}\cos(\theta)} \end{bmatrix},$$

$\theta_s$ is a set of predefined angles in a range of $[-\alpha, \alpha]$ degrees, $\theta_b$ is a base angle for the base codeword, and $V(0)$ is the base codeword selected at a first frame of a differential period.

19. The wireless device of claim 16, wherein Q is a predefined differential codebook where the differential DFT codeword is shifted from a center codeword by a fixed angle.

20. The wireless device of claim 16, wherein the transceiver is further configured to:
feedback to the BS a base DFT codeword in a base codebook using 4 bits prior to transmitting the differential DFT codeword, wherein the base DFT codeword is selected from sixteen predefined codewords.

21. The wireless device of claim 16, wherein the differential DFT codeword is included in a differential codebook that rotates angles of DFT codewords in a base codebook corresponding to the index angle to maintain a constant modulus of the differential DFT codewords.

22. A base station (BS) to use differential precoding for correlated antennas in a wireless network, the base station, comprising:
a transceiver adapted for communication with a mobile station (MS) in a wireless network, wherein the transceiver is further configured to receive feedback from a mobile station (MS) at the BS an index angle for a differential discrete Fourier transform (DFT) codeword corresponding to a shift of a dominate beam represented by a base codeword,
wherein the differential DFT codeword is included in a differential codebook that rotates angles of DFT codewords in a base codebook corresponding to the index angle to maintain a constant modulus of the differential DFT codewords, and
wherein the feedback corresponds to a precoding vector $V(t)=Q(\hat{\theta})$ for index angle $\hat{\theta}$, where $$Q(\hat{\theta}) = \begin{bmatrix} 1 \\ e^{j2\pi m/32} \\ e^{j4\pi m/32} \\ e^{j6\pi m/32} \end{bmatrix}$$

and $m=-16\cos(\hat{\theta})$.

23. The BS of claim 22, wherein the feedback uses 4 bits for a differential codebook selection in a subsequent frame after a base DFT codeword in a base codebook is selected for a first frame.

24. The BS of claim 22, wherein the transceiver is further configured to:
reconstruct the precoding vector $V(t)$ using the index angle in a predefined differential codebook based on a last precoding vector of a last frame and a base code word for a first frame.

25. The BS of claim 22, wherein the transceiver is further configured to:
reconstruct the precoding vector $V(t)$ using the index angle $\hat{\theta}$ in a predefined differential codebook Q, a base code word $V(0)$, wherein the index angle $$\hat{\theta} = \underset{\hat{\theta} \in \theta_s}{\mathrm{argmaxdet}} \left( I + \frac{\gamma}{N_s} Q(\hat{\theta})^H R Q(\hat{\theta}) \right),$$

where a short term channel covariance matrix $R=H^H H$ is measured by the MS, $$\theta_s \in \left[ \theta_b - \alpha : \frac{2\alpha}{15} : \theta_b + \alpha \right],$$

$$\theta_b = \underset{\theta \in [0,\pi)}{\mathrm{argmax}} |a(\theta)^H V(0)|^2,$$

and $$a(\theta) = \begin{bmatrix} 1 & e^{-j2\pi \frac{d}{\lambda}\cos(\theta)} & e^{-j2\pi \frac{2d}{\lambda}\cos(\theta)} & \ldots & e^{-j2\pi \frac{(N_t-1)d}{\lambda}\cos(\theta)} \end{bmatrix},$$

$\theta_s$ is a set of predefined angles in a range of $[-\alpha, \alpha]$ degrees, $\theta_b$ is a base angle for the base codeword, and $V(0)$ is the base codeword selected at a first frame of a differential period.

26. The BS of claim 22, wherein Q is a predefined differential codebook where the differential DFT codeword is shifted from a center codeword by a fixed angle.

27. The BS of claim 22, wherein the transceiver is further configured to:
receive feedback from the MS a base DFT codeword in a base codebook using 4 bits prior to receiving the differential DFT codeword, wherein the base DFT codeword is selected from sixteen predefined codewords.

* * * * *

UNITED STATES PATENT AND TRADEMARK OFFICE
CERTIFICATE OF CORRECTION

PATENT NO. : 8,873,417 B2
APPLICATION NO. : 13/591613
DATED : October 28, 2014
INVENTOR(S) : Xiaogang Chen et al.

It is certified that error appears in the above-identified patent and that said Letters Patent is hereby corrected as shown below:

In the Claims

In column 5, line 10-11, In Claim 3, delete " $\theta_b = \underset{\theta \in [0,\pi)}{\mathrm{argmax}} |a(\theta)^H V(0)|^2,$ " and insert -- $\theta_b = \underset{\theta \in [0,\pi]}{\mathrm{argmax}} |a(\theta)^H V(0)|^2,$ --, therefor.

In column 5, line 19, In Claim 3, delete "θ$_b$," and insert -- θ$_b$ --, therefor.

In column 5, line 39-40, In Claim 7, delete "(3G PP)" and insert -- (3GPP) --, therefor.

In column 5, line 48, In Claim 8, delete "precodinq" and insert -- precoding --, therefor.

In column 5, line 66-67, In Claim 10, delete "code word" and insert -- codeword --, therefor.

In column 6, line 4, In Claim 11, delete "code word" and insert -- codeword --, therefor.

In column 6, line 8-9, In Claim 11, delete " $\hat{\theta} = \underset{\hat{\theta} \in \theta_s}{\mathrm{argmaxdet}} \left( I + \frac{\gamma}{N_s} Q(\theta)^H R Q(\theta) \right),$ " and insert -- $\hat{\theta} = \underset{\hat{\theta} \in \theta_s}{\mathrm{argmaxdet}} \left( I + \frac{\gamma}{N_s} Q(\theta)^H R Q(\theta) \right)$ --, therefor.

In column 6, line 19-20, In Claim 11, delete " $\theta_b = \underset{\theta \in [0,\pi)}{\mathrm{argmax}} |a(\theta)^H V(0)|^2,$ " and insert -- $\theta_b = \underset{\theta \in [0,\pi]}{\mathrm{argmax}} |a(\theta)^H V(0)|^2,$ --, therefor.

Signed and Sealed this
Tenth Day of March, 2015

Michelle K. Lee
*Deputy Director of the United States Patent and Trademark Office*

CERTIFICATE OF CORRECTION (continued)
U.S. Pat. No. 8,873,417 B2

In column 6, line 28, In Claim 11, delete "$\theta_b$," and insert -- $\theta_b$ --, therefor.

In column 6, line 66, In Claim 16, delete "precodinq" and insert -- precoding --, therefor.

In column 7, line 19-20, In Claim 18, delete "$\hat{\theta} = \underset{\hat{\theta} \in \theta_c}{\mathrm{argmaxdet}}\left(I + \frac{\gamma}{N_s} Q(\hat{\theta})^H R Q(\hat{\theta})\right),$" and insert -- $\hat{\hat{\theta}} = \underset{\hat{\theta} \in \theta_s}{\mathrm{argmaxdet}}\left(I + \frac{\gamma}{N_s} Q(\theta)^H R Q(\theta)\right)$ --, therefor.

In column 7, line 28-29, In Claim 18, delete "$\theta_b = \underset{\theta \in [0,\pi)}{\mathrm{argmax}} |a(\theta)^H V(0)|^2,$" and insert -- $\theta_b = \underset{\theta \in [0,\pi]}{\mathrm{argmax}} |a(\theta)^H V(0)|^2,$ --, therefor.

In column 8, line 24, In Claim 24, delete "code word" and insert -- codeword --, therefor.

In column 8, line 30-31, In Claim 25, delete "code word" and insert -- codeword --, therefor.

In column 8, line 34-35, In Claim 25, delete "$\hat{\theta} = \underset{\hat{\theta} \in \theta_s}{\mathrm{argmaxdet}}\left(I + \frac{\gamma}{N_s} Q(\hat{\theta})^H R Q(\hat{\theta})\right),$" and insert -- $\hat{\hat{\theta}} = \underset{\hat{\theta} \in \theta_s}{\mathrm{argmaxdet}}\left(I + \frac{\gamma}{N_s} Q(\theta)^H R Q(\theta)\right)$ --, therefor.

In column 8, line 44-45, In Claim 25, delete "$\theta_b = \underset{\theta \in [0,\pi)}{\mathrm{argmax}} |a(\theta)^H V(0)|^2,$" and insert -- $\theta_b = \underset{\theta \in [0,\pi]}{\mathrm{argmax}} |a(\theta)^H V(0)|^2,$ --, therefor.